United States Patent
Rist et al.

(10) Patent No.: US 12,030,549 B2
(45) Date of Patent: Jul. 9, 2024

(54) CLAMPING APPARATUS FOR A STEERING COLUMN AND STEERING COLUMN FOR A MOTOR VEHICLE

(71) Applicants: thyssenkrupp Presta AG, Eschen (LI); thyssenkrupp AG, Essen (DE)

(72) Inventors: Sascha Rist, Hard (AT); Martin Fleischer, Balgach (CH); Thomas Geiselberger, St. Gallen (CH); Thomas Agbor, Homburg (DE)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 624 days.

(21) Appl. No.: 17/297,548

(22) PCT Filed: Dec. 2, 2019

(86) PCT No.: PCT/EP2019/083264
§ 371 (c)(1),
(2) Date: May 27, 2021

(87) PCT Pub. No.: WO2020/114951
PCT Pub. Date: Jun. 11, 2020

(65) Prior Publication Data
US 2022/0041204 A1    Feb. 10, 2022

(30) Foreign Application Priority Data
Dec. 3, 2018 (DE) .................... 10 2018 220 847.6

(51) Int. Cl.
*B62D 1/184* (2006.01)
*B62D 1/16* (2006.01)
*B62D 1/189* (2006.01)

(52) U.S. Cl.
CPC .............. *B62D 1/184* (2013.01); *B62D 1/166* (2013.01); *B62D 1/189* (2013.01)

(58) Field of Classification Search
CPC ........ B62D 1/184; B62D 1/189; B62D 1/187; B62D 1/16
(Continued)

(56) References Cited

U.S. PATENT DOCUMENTS 5,931,501 A    8/1999 Baumann
9,758,188 B1 *  9/2017 Buzzard ................. B62D 1/184
(Continued)

FOREIGN PATENT DOCUMENTS

CN    107810136 A    3/2018
CN    107921986 A    4/2018
(Continued)

OTHER PUBLICATIONS

English Translation of International Search Report issued in PCT/EP2019/083264, dated Mar. 5, 2020.

*Primary Examiner* — Toan C To
(74) *Attorney, Agent, or Firm* — thyssenkrupp North America, LLC (57) ABSTRACT

A clamping apparatus may include a stroke-generating disk that is rotatable about a clamping axis and is connected via a first stroke-generating gearing and a second stroke-generating gearing to a pressure disk, which is stationary relative to the rotation of the stroke-generating disk. The first stroke-generating gearing converts a relative rotation of the stroke-generating disk in a first actuating angle range in the clamping direction into a first axial stroke relative to the pressure disk. The second stroke-generating gearing converts a further rotation of the stroke-generating disk following the first actuating angle range in a second actuating angle range into a second axial stroke between the stroke-generating disk and the pressure disk. At least one of the stroke-generating gearings is a tilting pin gearing, with at least one tilting pin supported in the direction of its pin axis between
(Continued)

corresponding bearing points on the stroke-generating disk and the pressure disk.

13 Claims, 4 Drawing Sheets

(58) Field of Classification Search
USPC .................................................. 74/491, 492
See application file for complete search history.

(56) References Cited

U.S. PATENT DOCUMENTS

| | | | |
|---|---|---|---|
| 9,969,420 B2* | 5/2018 | Ishii | B62D 1/184 |
| 11,279,393 B2* | 3/2022 | Jacobs | B62D 1/187 |
| 11,891,110 B1* | 2/2024 | Messing | B62D 1/187 |
| 2012/0312117 A1 | 12/2012 | Maniwa | |
| 2013/0118290 A1 | 5/2013 | Burns | |
| 2016/0297463 A1 | 10/2016 | Tomaru et al. | |
| 2018/0170419 A1 | 6/2018 | Blattler et al. | |
| 2018/0290680 A1 | 10/2018 | Huber | |

FOREIGN PATENT DOCUMENTS

| | | |
|---|---|---|
| DE | 196 38 282 C | 2/1998 |
| DE | 10 2007 033 959 A | 2/2009 |
| DE | 10 2012 220 550 A | 5/2013 |
| DE | 10 2016 220 003 A | 4/2018 |
| EP | 0 606 085 A | 7/1994 |
| JP | 2015150982 A | 8/2015 |
| WO | 2018/069224 A | 4/2018 |

* cited by examiner

CLAMPING APPARATUS FOR A STEERING COLUMN AND STEERING COLUMN FOR A MOTOR VEHICLE

CROSS REFERENCE TO RELATED APPLICATIONS

This application is a U.S. National Stage Entry of International Patent Application Serial Number PCT/EP2019/083264, filed Dec. 2, 2019, which claims priority to German Patent Application No. DE 10 2018 220 847.6, filed Dec. 3, 2018, the entire contents of both of which are incorporated herein by reference.

FIELD

The present disclosure generally relates to steering columns, including clamping apparatuses for steering columns.

BACKGROUND

In the case of adjustable steering columns for motor vehicles, the steering spindle, to the rear end of which with respect to the direction of travel the steering wheel is attached, is mounted rotatably in an actuating unit which can be positioned and fixed relative to the vehicle body in order to adjust the steering wheel position.

A supporting unit of the steering column, to which supporting unit the actuating unit can be fastened by means of a releasable clamping device, is attached fixedly to the vehicle body. The clamping device can be brought either into a clamping or fixing position or release or enabling position by manual or motor-operated actuation. In the release position, the actuating unit can be adjusted relative to the supporting unit, and, in the fixing position, the actuating unit is braced in a fixed position with the supporting unit. For the fixing, an actuating movement in a locking direction, a locking or fixing movement, is converted by a stroke-generating gearing of the clamping device into a stroke, namely a clamping stroke, as a result of which a clamping force is exerted with which the actuating unit and the supporting unit are braced against each other. The clamping force is removed by opposite actuation in the release direction.

In a design known, for example, from DE 10 2016 220 003 A1, a stroke-generating gearing is formed between a stroke-generating disk and a pressure disk, which disks are arranged axially one following the other on a clamping axis. For the actuation, the stroke-generating disk is rotated relative to the pressure disk about the clamping axis, wherein, for the fixing, a relative rotation about an actuating angle in the locking direction takes place, said rotation being converted in a stroke-generating gearing into an axial stroke, with the axial distance between the stroke-generating disk and the pressure disk being increased. The stroke moves side cheeks of a supporting unit, the side cheeks protruding, for example, in a fork-like manner, toward one another such that an actuating unit arranged between the side cheeks is clamped and thereby fixed. To For the release, the relative rotation takes place in the opposite direction, as a result of which the stroke-generating disk is lowered relative to the pressure disk.

DE 10 2007 033 959 A1 describes arranging a first and a second stroke-generating gearing in order to optimize the clamping function between the stroke-generating disk and the pressure disk. The two stroke-generating gearings realize a two-stage arrangement with two clamping steps which are effective in series. In the event of an actuation for fixing purposes, a rotation in a first actuating angle range is converted by the first stroke-generating gearing into a first axial stroke, and, by further rotation in a following second actuating angle range, into a second stroke adjoining the first stroke. The first stroke-generating gearing has a first transmission ratio which specifies the ratio of the clamping force applied at the output by the stroke to the introduced actuating force, said ratio being smaller than the second transmission ratio of the second stroke-generating gearing. During the locking action, the first stroke-generating gearing thereby generates a relatively large stroke with a small clamping force and then the second stroke-generating gearing a greater clamping force with a smaller stroke. The release takes place by rotation in the opposite direction, as a result of which first of all the second stroke-generating gearing, and then the first stroke-generating gearing, is brought into the lowered release position.

By means of the series-connected stroke-generating gearings, an actuation for fixing purposes can first of all be converted into a relatively large stroke, for example in order to bring form-fitting elements into engagement with one another, for which purpose a small clamping force is sufficient. The following small stroke with a large clamping force can result in a secure frictionally engaged locking.

In the known embodiment, the first stroke-generating gearing is designed as a cam gearing in which cams formed on the stroke-generating disk are directed axially by sliding slopes rising in a wedge-shaped manner in the circumferential direction against a complementary slotted guide mechanism formed on the pressure disk. The second stroke-generating gearing has tracks on the stroke-generating disk and the pressure disk, between which tracks balls are arranged as rollable rolling elements. Such a rolling bearing arrangement runs smoothly, and, by means of tracks rising with a very gradual incline, a high transmission ratio with a large clamping force can be realized with a small stroke. However, the high clamping force in the contact between the balls and the tracks generate such a high surface pressure that the balls are molded plastically into the track and can leave behind recessed impressed marks. The tracks thereby become uneven and worn, which results in a nonuniform and jerky transmission of force. This can impair the clamping function and leads in every case to an operating sensation that is perceived to be negative. In order to reduce the wear of the tracks, though the clamping force generated can be reduced, the result, however, is that the fixing is weakened.

Thus a need exists for an improved two-stage clamping apparatus which solves the abovementioned problems and has lower wear.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a clamping apparatus for a steering column, comprising a stroke-generating disk which is rotatable about a clamping axis and is connected via a first stroke-generating gearing and at least one second stroke-generating gearing to a pressure disk, which is stationary relative to the rotation of the stroke-generating disk, wherein the first stroke-generating gearing is designed to convert a relative rotation of the stroke-generating disk in a first actuating angle range in the clamping direction into a first axial stroke relative to the pressure disk, and the second stroke-generating gearing is designed to convert a further rotation of the stroke-generating disk following the first actuating angle range in a second actuating angle range into a second axial stroke between the stroke-generating disk and the pressure disk.

In the case of a clamping apparatus for a steering column, comprising a stroke-generating disk which is rotatable about a clamping axis and is connected via a first stroke-generating gearing and at least one second stroke-generating gearing to a pressure disk, which is stationary relative to the rotation of the stroke-generating disk, wherein the first stroke-generating gearing is designed to convert a relative rotation of the stroke-generating disk in a first actuating angle range in the clamping direction into a first axial stroke relative to the pressure disk, and the second stroke-generating gearing is designed to convert a further rotation of the stroke-generating disk following the first actuating angle range in a second actuating angle range into a second axial stroke between the stroke-generating disk and the pressure disk, it is provided according to the invention that at least one of the stroke-generating gearings is designed as a tilting pin gearing, with at least one tilting pin which is supported in the direction of its pin axis between corresponding bearing points on the stroke-generating disk and the pressure disk.

The second stroke-generating gearing can preferably be designed as a tilting pin gearing. This preferably has a greater transmission ratio than the first stroke-generating gearing. In the event of an actuation by means of relative rotation between the stroke-generating disk and the pressure disk, the tilting pin gearing brings about a smaller stroke with a greater clamping force than the first stroke-generating gearing during the same relative rotation.

The tilting pin gearing can be constructed in a form which is known per se, with one or preferably more than one elongate pin-shaped tilting pins being distributed over the circumference and being supported against the axially mutually opposite end sides of the stroke-generating disk and the pressure disk in such a manner that they can be brought by means of a relative rotation from an inoperative position, which is inclined relative to the clamping axis and corresponds to the release position, into a yield position which lies approximately parallel to the clamping axis and which corresponds to the fixing position at a maximum stroke.

The tilting pin gearing preferably has precisely two or precisely three or precisely four tilting pins. These can be arranged distributed preferably uniformly or non-uniformly over the circumference.

According to the invention, the specific advantages of a tilting pin gearing are used for optimizing a two-stage clamping apparatus. A defined transmission ratio can be realized by the dimensioning and arrangement of the tilting pins. In particular in the vicinity of what is referred to as dead center position or yield point position, in which the tilting pins in the maximally possible stroke lie parallel to the clamping axis, a high transmission ratio with a large clamping force can be realized.

At both of their ends, the tilting pins preferably each have a bearing head which is mounted in each case in a bearing point which is formed in the stroke-generating disk and the pressure disk and which transmits the clamping force components which occur to the tilting pin in the axial and radial direction and in the circumferential direction. A bearing point preferably has a trough-shaped depression which is also referred to as a bearing pocket or pocket, in which in each case one tilting pin dips axially at one end and is mounted and supported so as to be pivotable in an articulated manner transversely with respect to the clamping axis. For example, the ends of a tilting pin can have bearing heads in the form of a spherical section, what are referred to as ball heads, and the bearing points can be correspondingly configured as ball sockets corresponding to said ball heads, thus resulting in the formation in each case of ball and socket joints.

During the actuation in order to fix the clamping apparatus, the tilting pins between the stroke-generating disk and the pressure disk are set upright in the direction of the stroke until the maximum stroke at the maximum clamping force is reached when said tilting pins are oriented parallel to the clamping axis in the dead center position or yield position. In a corresponding manner, the exerted clamping force between the tilting pins and the bearing points thereof then act as the maximum loading. The bearing surface which is in each case loaded here by the bearing force in the bearing points can be configured by means of an adapted shaping and dimensioning so as to be capable of being load-bearing such that, even in the event of a high clamping force, no impermissibly high surface pressures and thus no permanent deformations or wear occur at the tilting pins and the stroke-generating disk or the pressure disk.

The tilting pins preferably comprise a steel, or are formed from a steel. The steel is particularly preferably hardened. In order to reduce the wear even further, the tilting pin can be completely hardened. It has been shown in tests that a minimum Vickers hardness of the surface of the tilting pin of greater than or equal to 300 HV30 according to DIN EN ISO 6507 is advantageous and significantly reduces the wear.

One advantage of a tilting pin gearing according to the invention, in the second stroke-generating gearing over the rolling bearing arrangement known from the prior art is that a higher force transmission ratio and lower wear can be realized. This ensures a uniform operating sensation, which is perceived to be pleasant, throughout the entire operating period of a steering system.

The tilting pin gearing can preferably be effectively arranged in series with the other stroke-generating gearing. The tilting pin gearing particularly preferably forms a second stroke-generating gearing which is arranged effectively in series with the first stroke-generating gearing. The stepwise activation of the two stroke-generating gearings during the actuation in order to fix the clamping apparatus is thereby predetermined. During the fixing, the first stroke-generating gearing, after a relative rotation over a first actuating angle range is at its maximum first stroke. A continuation of the rotation into the second actuating angle range activates the tilting pin gearing, with the second stroke thereof being added to the first stroke in order to increase the axial distance between the stroke-generating disk and the pressure disk. Conversely, during the rotational movement in order to release the clamping apparatus, first of all, by tilting of the tilting pins out of the yield position, the stroke of the tilting pin gearing is shortened and then the first stroke-generating gearing is brought into its release position in which the stroke-generating disk and the pressure disk are lowered toward each other until they are at the shortest axial distance from each other in the release position.

It can be provided that the stroke-generating disk is attached to a drive element for rotation therewith. The drive element can comprise an actuating lever, also referred to as a clamping lever, which permits a manual actuation of the clamping apparatus by rotation of the stroke-generating disk relative to the pressure disk which is secured on the steering column. It is likewise possible to provide a motor-operated actuator for the relative rotation. Such an actuator can preferably comprise an electric servomotor which is preferably coupled to a drive element via a gearing. In the case of such a motor-operated clamping apparatus, the use according to the invention of a tilting pin gearing has the particular advantage that mechanical and electrical malfunctions due to a nonuniform and jerky operation of the actuator, which can occur in the prior art when tracks are worn or damaged, can be substantially avoided.

In order to realize a clamping apparatus on a steering column, it can be provided that the stroke-generating disk is attached to a clamping bolt in a manner mounted rotatably about the clamping axis. The clamping bolt can be mounted rotatably, for example in the casing unit of a steering column, and can pass through the two side cheeks between which the actuating unit is located. The stroke-generating disk can be fastened on the actuating side to the clamping bolt for rotation therewith. The pressure disk is supported from the outside against the one side cheek. At its end facing away from the actuating side, the clamping bolt is supported from the outside on the other side cheek via an abutment. As a result, an increase in the stroke between the stroke-generating disk and the pressure disk is converted into a compressive stress acting from the outside against the side cheeks, with the clamping bolt being subjected to a tensile stress, by means of which the side cheeks are braced by the clamping force (compressive force) against the actuating unit. The clamping bolt preferably passes coaxially through the pressure disk and is either connected to the stroke-generating disk for rotation therewith, and is rotated together therewith for the actuation, or the stroke-generating disk is mounted rotatably on a clamping bolt which is stationary during the actuation. The stroke-generating disk in each case can be coupled to an actuating lever or to a motor-operated actuator.

It can preferably be provided that the first stroke-generating gearing and the second stroke-generating gearing are arranged coaxially. The tilting pin gearing according to the invention preferably has two or more tilting pins arranged uniformly over the circumference coaxially with respect to the clamping axis. Said tilting pins can be arranged radially within, outside and/or on a circumferential region, and/or axially at least partially within or outside an axial region in which the first stroke-generating gearing is located. A compact, space-saving design can thereby be realized.

It is advantageous that the bearing points have bearing pockets molded in a recessed manner into the stroke-generating disk and/or the pressure disk. The bearing pockets can be designed as trough-shaped depressions which are designed in a manner corresponding to the bearing heads at the ends of the tilting pins in order to form a joint arrangement having two rotation degrees of freedom. For example, the tilting pins can have ball heads, i.e. spherically shaped ends, which are mounted in bearing pockets in the form of corresponding ball sockets. The ball sockets can likewise have a spherical inner cross section which is adapted with a predetermined bearing play to the diameter of the ball heads.

An advantageous development makes provision for the bearing pockets to have a profile which is conical in cross section or, particularly preferably, a gothic profile. This produces a defined annular bearing surface between the ball head and the bearing pocket, which permits a high bearing load for a defined bearing geometry. A gothic profile with two circular segments converging to a point provides a particularly advantageous lower surface pressure, also referred to in this case as Hertzian stress, and a lower notch effect, thus permitting a greater loading and greater operational reliability.

In an advantageous embodiment of the invention, a positioning element is designed for the defined positioning of the tilting pin relative to the stroke-generating disk and/or relative to the pressure disk. If the clamping device is released by relative rotation in the release direction, the stroke-generating disk is lowered towards the pressure disk until the end position of the second stroke-generating gearing is first reached. The tilting pins pass out of the yield position into a tilting position in the process. During further lowering by release of the first stroke-generating gearing, the bearing points on the stroke-generating disk and the pressure disk move away from one another because of the different kinematics of the two stroke-generating gearings, and therefore the tilting pins lose contact with at least one of the bearing points and are no longer held in a defined manner between the bearing points. By means of the positioning element, also referred to as retaining element, the tilting pins are then held in a defined spatial position and orientation with respect to the stroke-generating disk or the pressure disk. An uncontrolled shifting of the tilting pins is thereby prevented. In addition, it is ensured that, during the fixing, the tilting pins engage in a defined and reproducible manner in the bearing points. If the second stroke-generating gearing is activated during the fixing, that end of the tilting pin which is free but is held in a defined manner by the positioning element securely enters the bearing point, and the stroke-generating force is transmitted by the tilting pin via the two bearing points.

The positioning element can preferably comprise at least one spring element which loads the tilting pin resiliently against the stroke-generating disk and/or the pressure disk. The spring element can, for example, press a tilting pin elastically counter to the direction of rotation during the fixing into a bearing point in the form of a depression or ball socket. The spring element can thereby elastically assist the tilting pins taking up a defined inoperative position. When the second stroke-generating gearing is activated, the bearing heads of the tilting pins engage in the bearing points and are brought by further rotation counter to the spring force into the yield position.

At least one spring element, preferably a number of spring elements corresponding to the number of tilting pins, can be attached to a spring support. A spring support can be secured on the stroke-generating disk or the pressure disk on which the tilting pins are intended to be held by the spring elements. The spring support can be formed, for example, annularly and coaxially surrounds the pressure disk and/or the stroke-generating disk. The spring elements can protrude in an elastically deformable manner from the spring support, wherein the spring support can be designed, for example, as a plastics or sheet-metal shaped part. It is possible for the spring elements to be formed integrally with the spring support, for example as spring-elastic plastics or sheet-metal tabs.

In an advantageous embodiment of the invention, the tilting pin gearing has a stable clamping position in which the stroke-generating disk and the pressure disk are rotated counter to each other beyond the maximum stroke of the tilting pin gearing, wherein stop means are formed which, in the stable clamping position, strike against one another in the circumferential direction and block a further rotation beyond the stable clamping position. The reaction of the clamping force exerted by the stroke causes a restoring force, which is directed counter to the rotation for fixing purposes, to act on the stroke-generating and tilting disk. At the maximum stroke, when the tilting pins are in the dead center position or yield position, the clamping force acts in the direction of the tilting pins, thus generating a labile state. Even a small malfunction could lead to the clamping apparatus being automatically moved back again into the release position by the restoring force. In order to permanently secure the stroke position and thus the fixing position, use is made according to the invention of the fact that, when the yield position is exceeded by further rotation, the restoring force this time acts in the direction of the rotation for fixing purposes and automatically further rotates the stroke-generating disk and the pressure disk. After the yield position is exceeded, the stop means block a further relative rotation. The restoring force acting on the stop produces a stable state in which the stroke-generating disk and the pressure disk are held relative to each other. Owing to the actuating force which is required for the rotation for fixing purposes increasing as far as the yield position and then the effective restoring force bringing about the further rotation as far as the stop, a latching point is defined which has to be overcome during the fixing operation and reliably and unambiguously indicates when the stable clamping position is reached. The use of the dead center position or yield position which is specific for the tilting pin gearing makes it possible to realize a pleasant operating sensation upon manual actuation via a clamping lever. In other words, what is referred to as a "latching sensation" can be produced since, after the dead center or yield position is exceeded, the operating force is greatly reduced and the operating force changes its direction, i.e. a sign change of the operating force value takes place. In addition, the latching point can be realized with lower wear than in the case of other designs of latching devices.

The stop means can comprise stop surfaces which can be brought into contact against one another in the circumferential direction in the direction of the rotation for fixing purposes and which correspond to one another on the stroke-generating disk and the pressure disk, on the tilting pins and on the stroke-generating disk or the pressure disk. For example, the bearing pockets in the form of depressions can be configured in such a manner that they permit only a small, limited tilting of the tilting pins after the yield position is reached, and therefore the tilting pins form form-fitting elements. Alternatively or additionally, the stroke-generating disk and the pressure disk can each have a stop portion with a respective stop surface which can be brought into operative engagement with each other in order to provide a stop situation in which the pressure disk and the stroke-generating disk cannot be rotated further in said direction of rotation, i.e. further rotation in this direction of rotation is prevented by means of the striking.

The invention furthermore comprises that the first stroke-generating gearing is designed as a cam gearing, with cams which are formed on the stroke-generating disk and are directed axially against a complementary slotted guide mechanism formed on the pressure disk. Such cam gearings are known for bracing steering columns. They have a stroke-generating disk in the form of a cam disk, and a pressure disk which is complementary with respect thereto and is in the form of a slotted guide disk. The slotted guide disk has a slotted guide contour with a circular cam track, with sliding slopes—ramps which rise in a wedge-shaped manner in the circumferential direction and along which the cams of the cam disk can slide in the circumferential direction. The second stroke-generating gearing is designed according to the invention as a tilting pin gearing. It is advantageous here that the bearing points for the tilting pins are arranged in the region of the cams or the slotted guide track, for example as a bearing pocket molded into a cam or between two cams. This makes it possible to realize a particularly compact construction of the two stroke-generating gearings. It is advantageous here if the number of the tilting pins corresponds to the number of the cams, for example each of the cams has a bearing point.

In an advantageous development, two stroke-generating gearings are designed as tilting pin gearings. In other words, the first and second stroke-generating gearings are designed as tilting pin gearings.

In a development, the clamping device comprises a stroke-generating disk which is rotatable about a clamping axis and is connected via a first stroke-generating gearing, a second stroke-generating gearing, a third stroke-generating gearing and a fourth stroke-generating gearing to a pressure disk which is stationary relative to the rotation of the stroke-generating disk, wherein an intermediate disk is arranged between the stroke-generating disk and the pressure disk and is rotatable in relation to the stroke-generating disk and the pressure disk, wherein the first and second stroke-generating gearings are arranged between the stroke-generating disk and the intermediate disk, and the third and fourth stroke-generating gearings are arranged between the intermediate disk and the pressure disk, wherein the first stroke-generating gearing is designed to convert a relative rotation of the stroke-generating disk in a first actuating angle range in the clamping direction into a first axial stroke relative to the pressure disk, and the second stroke-generating gearing is designed to convert a further rotation of the stroke-generating disk following the first actuating angle range in a second actuating angle range into a second axial stroke between the stroke-generating disk and the pressure disk, and the third stroke-generating gearing is designed to convert a further rotation of the stroke-generating disk following the second actuating angle range in a third actuating angle range into a third axial stroke between the stroke-generating disk and the pressure disk, and the fourth stroke-generating gearing is designed to convert a further rotation of the stroke-generating disk following the third actuating angle range in a fourth actuating angle range into a fourth axial stroke between the stroke-generating disk and the pressure disk.

According to the invention, at least one of the stroke-generating gearings is designed as a tilting pin gearing, with at least one tilting pin which is supported in the direction of its pin axis between corresponding bearing points on the stroke-generating disk and the intermediate disk, or the intermediate disk and the pressure disk.

In an advantageous development, two of the stroke-generating gearings are designed as tilting pin gearings. The second stroke-generating gearing and the fourth stroke-generating gearing are particularly preferably designed as tilting pin gearings.

The invention furthermore comprises a steering column, comprising a supporting unit and an actuating unit, and with a clamping apparatus which is operatively connected to the supporting unit and to the actuating unit and is designed to exert a clamping force for bracing the supporting unit and the actuating unit, characterized in that the clamping apparatus is configured according to one or more of the embodiments described previously.

The pressure disk is preferably held on the supporting unit so as to non-rotatable about the clamping axis.

Figure 1:
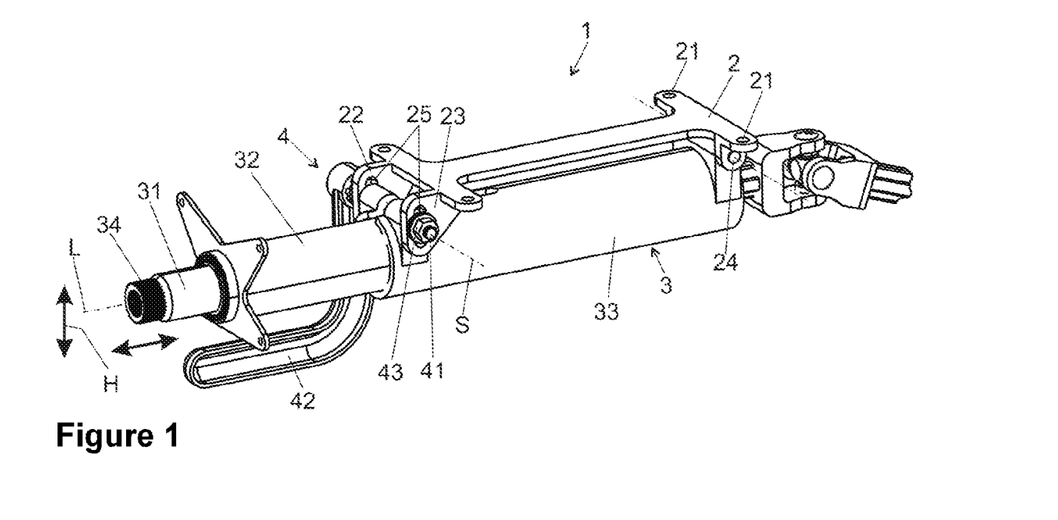
FIG. 1 is a schematic perspective view of a steering column with an example clamping apparatus.
Figure 2:
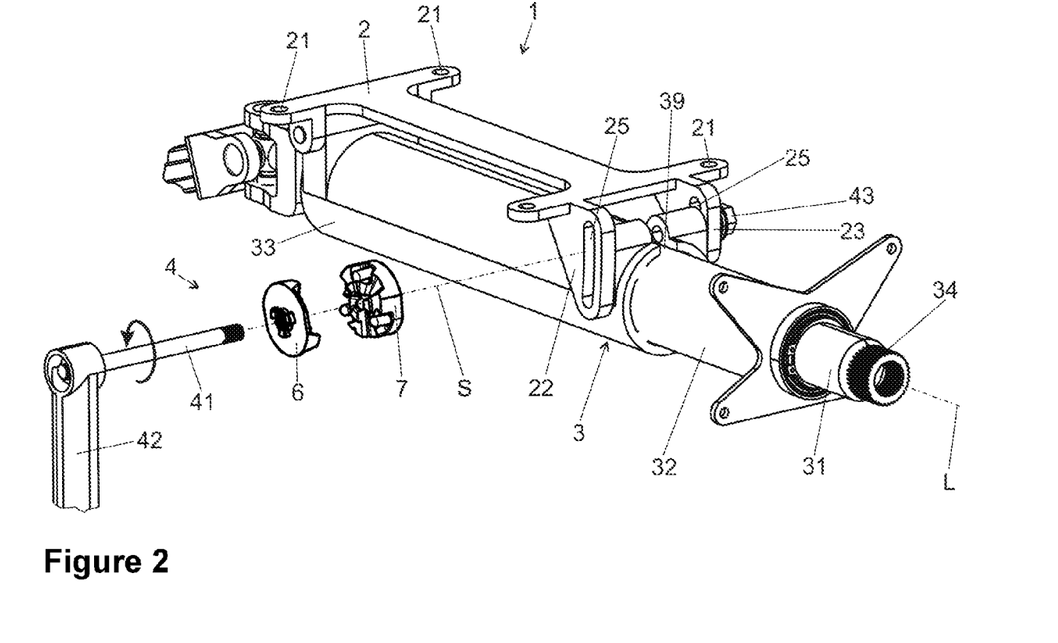
FIG. 2 is a schematically exploded view of the clamping apparatus of the steering column according to FIG. 1.
Figure 3:
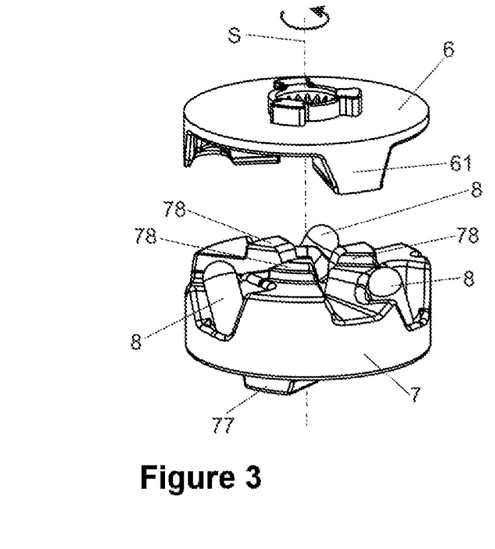
FIG. 3 is an enlarged exploded view of an example clamping apparatus.

FIGS. 1 and 2 show, in a perspective view obliquely from the rear right (FIG. 1) and rear left, partially in an exploded illustration (FIG. 2)—with respect to the direction of travel of a vehicle, not shown—a steering column 1 which has a supporting unit 2. For connection to the body of a motor vehicle, not illustrated, the supporting unit 2 comprises fastening means 21. Mutually opposite side cheeks 22 and 23 extend from the supporting unit 2 and protrude downward in a fork-like manner from the supporting unit 2.

An actuating unit 3 is arranged between the side cheeks 22 and 23, with a steering spindle 31 which is mounted in an inner casing tube 32 so as to be rotatable about a longitudinal axis L. The casing tube 32 is accommodated in an outer casing unit 33 so as to be longitudinally displaceable in the direction of the longitudinal axis L, as indicated schematically with a double arrow. At the rear end with respect to the direction of travel, the steering spindle has a fastening portion 34 for attaching a steering wheel, not illustrated, for rotation therewith.

The casing unit 33 is mounted on the supporting unit 2 so as to be pivotable about a pivot axis 24 which lies transversely with respect to the longitudinal axis L. The actuating unit 3 can thereby be moved to and fro in the vertical direction H relative to the supporting unit in order to adjust the height position of the steering wheel between the side cheeks 22 and 23, as indicated by a double arrow.

A clamping apparatus 4 is designed in order either to brace the actuating unit 3 in the fixing position relative to the supporting unit 2 or, in the enabling position, to permit an adjustment in the direction of the longitudinal axis L and/or in the vertical direction H.

The casing unit 33 has a slot 39 which extends in the direction of the longitudinal axis and forms a clip. In the fixing position, the width of the slot 39 is smaller than the width of the slot 39 in the enabling position, and therefore the casing tube 32 is clamped in the casing unit in the fixing position and is thus non-displaceable in relation to the casing unit 33 during normal operation.

The clamping apparatus 4 has a clamping bolt 41 which extends on a clamping axis S transversely with respect to the longitudinal axis L through elongated holes 25 in the mutually opposite side cheeks 22 and 23. The elongated holes 25 are extended in the vertical direction H. An actuating lever 42 is attached to one end of the clamping bolt 41 for rotation therewith while the other end is tightly mounted on the side cheek 23 in an abutment 43 so as to be rotatable.

The clamping apparatus 4 has a two-stage stroke-generating gearing 5 in which a first and a second stroke-generating gearing according to the invention are integrated. The stroke-generating gearing 5 is illustrated in detail in FIGS. 3 to 12 below and comprises a stroke-generating disk 6, a pressure disk 7 (slotted guide disk) and, in the example shown, three tilting pins 8.

The stroke-generating disk 6 and the pressure disk 7 are arranged on the clamping bolt 41 coaxially with respect to the clamping axis S, wherein the stroke-generating disk 6 is connected to the clamping bolt 7 for rotation therewith. The pressure disk 7 is secured on the outside of the side cheek 22 in a stationary manner with respect to rotation. For this purpose, the pressure disk 7 has a projection 77 which engages in the one elongated hole 25 of the side cheek and thus limits or prevents rotation of the pressure disk 7 about the clamping axis S.

For the explanations below, the direction of rotation of the clamping bolt 41 and of the stroke-generating disk 6 relative to the pressure disk 7 for fixing purposes is defined as rotation counterclockwise, in a view from the outside of the stroke-generating disk 6, as indicated in FIG. 2. This direction of rotation of the fixing movement or fixing rotation is adopted and indicated schematically in the figures below.

Figure 4:
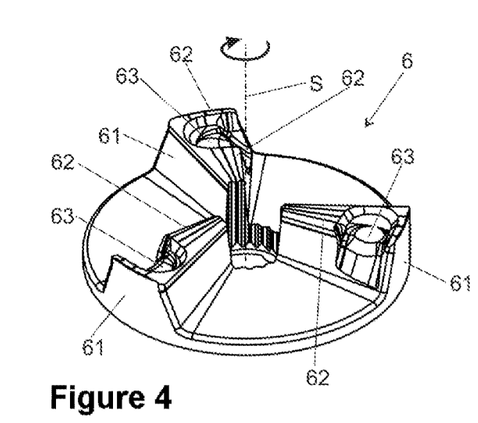
FIG. 4 is an enlarged exploded view of an example stroke-generating disk of the clamping apparatus according to FIG. 3.

The end side of the stroke-generating disk 6 facing the pressure disk 7 has three axially protruding cams 61 which extend radially in the form of segments of a circle. The cams 61 each have a sliding slope 62 on their side surface facing in the direction of rotation during a fixing rotation (counterclockwise). The sliding slope 62 forms a ramp-shaped sliding surface rising in the circumferential direction.

Figure 5:
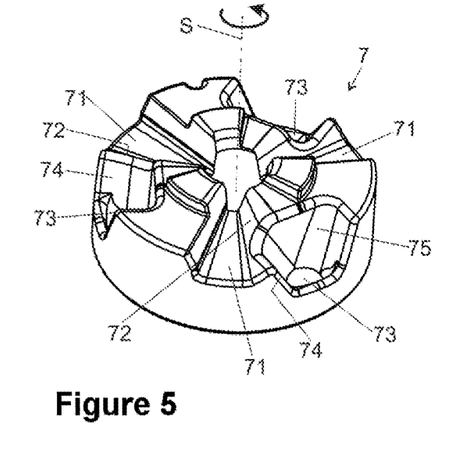
FIG. 5 is an enlarged exploded view of an example pressure disk of the clamping apparatus according to FIG. 3.
Figure 6:
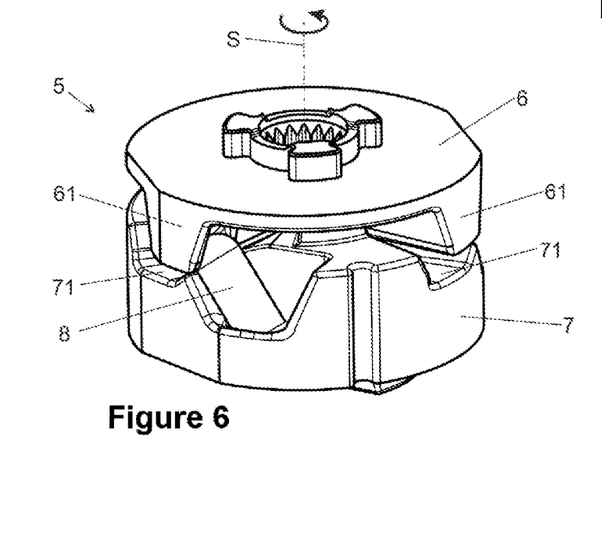
FIG. 6 is a perspective view of the clamping apparatus according to FIG. 3 in an assembled state.

The pressure disk 7 is designed as a slotted guide disk, with slotted guide tracks which correspond to the cams 61 of the stroke-generating disk 6 and, beginning in each case in a valley 71 molded in axially, merge in the circumferential direction, with the direction of rotation during a fixing rotation, rising in a wedge-shaped manner into sliding slopes 72. In each case one valley 71 is designed as an axially molded depression which corresponds to in each case one cam 61.

The cams 61 together with the valleys 71 form a first stroke-generating gearing, namely a cam gearing, as is known in principle from the prior art.

Figure 7:
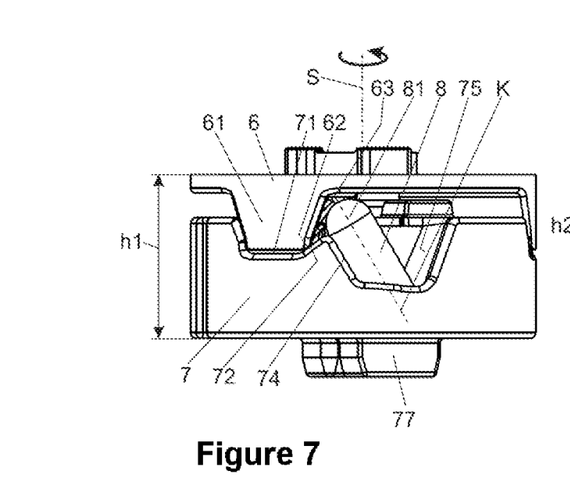
FIG. 7 is a lateral view of the clamping apparatus according to FIGS. 2 to 6 in a release position.

FIG. 7 shows how the cams 61 in the release position axially enter the valleys 71. The sliding slopes 62 and 72 at least partially lie against each other in the circumferential direction. The stroke-generating gearing 5 is in a release position in which the stroke-generating disk 6 and the pressure disk 7, as measured over their mutually averted outer sides, are at an axial distance h1 which can also be referred to as an idle or release stroke.

Figure 8:
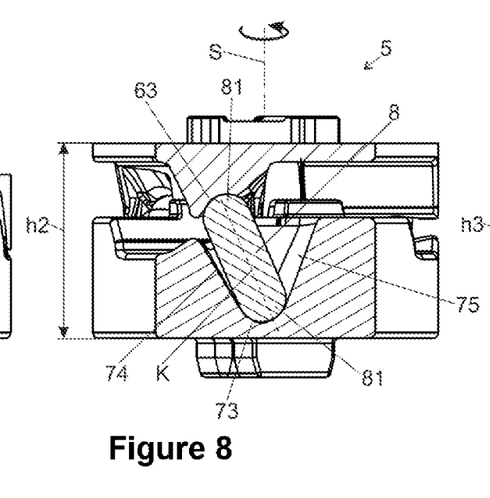
FIG. 8 is a lateral sectional view of the clamping apparatus from FIG. 7 in an intermediate position.

If the stroke-generating disk 6 is rotated from the release position shown in FIG. 7 by a first actuating angle range in the fixing direction counterclockwise relative to the pressure disk 7, as indicated with the arrow, the sliding slopes 62 and 72 slide onto each other in the circumferential direction and, by means of their wedge shape, bring about a first stroke which is associated with an increase in the axial distance h1 to the distance h2, as shown in FIG. 8. The difference (h2−h1) accordingly corresponds to the first stroke.

A second stroke-generating gearing designed according to the invention as a tilting pin gearing has the tilting pins 8 which are arranged between the stroke-generating disk 6 and the pressure disk 7, as will be explained below.

Each tilting pin 8 is of cylindrical pin-shaped design and extends along its tilting pin axis K. At both ends of a tilting pin 8 hemispherically rounded ball heads 81 are formed. With the one end, a tilting pin 8 is in each case mounted in a bearing pocket 73 which is formed in the circumferential direction between two valleys 71 in the pressure disk 7. The bearing pocket 73 is shaped as a joint socket corresponding to the ball head 81, in order to form a two-axis tilting joint. In the region of the ball head 81, the bearing pocket 83 preferably has a gothic cross-sectional profile with two circular arcs 731 which converge in a pointed manner at a center point M and which have a larger radius than the ball head 81, as can be seen in the enlarged view of FIG. 9a. As a result, the ball head lies in the bearing pocket 73 only on an annularly encircling bearing surface 82. It can also be provided that the bearing pocket 73 has a spherical cross section.

Figure 9:
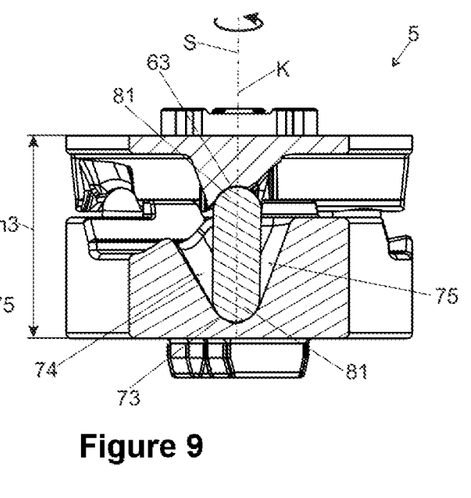
FIG. 9 is a lateral sectional view of the clamping apparatus from FIGS. 7 and 8 at a maximum stroke in a yield position of tilting pins.
Figure 9A:
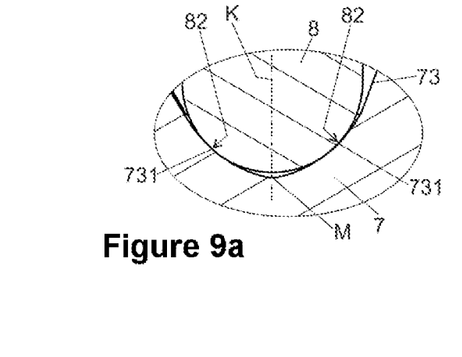
FIG. 9a is a detail sectional view of the tilting pin mounting from FIG. 9.

The ball head 81 is supported radially, axially and in the circumferential direction in the bearing pocket 73.

The bearing pocket 73 has a supporting surface 74 on its side lying opposite the fixing direction, and a counter surface 75 on its side lying at the front in the fixing direction.

In the release position shown in FIG. 7, the tilting pin 8 is maximally inclined toward the clamping axis S, and lies in its inoperative position against the supporting surface 74.

A bearing pocket 63 is formed in the stroke-generating disk 6, in each case in the region of a cam 61, said bearing pocket corresponding in each case to the ball head 81 of a tilting pin 8, the ball head facing away from the pressure disk 7. The bearing pocket 63 can preferably have a gothic cross-sectional profile, analogously to the cross section of the bearing pocket 73 according to FIG. 9a.

In the state shown in FIG. 8, the tilting pin 8 engages with its ball head 81 in the bearing pocket 63 such that it is supported radially, axially and in the circumferential direction therein during the further rotation in the fixing direction. The tilting pin gearing is thereby activated.

If the stroke-generating disk 6 is rotated from the intermediate position shown in FIG. 8 further in the fixing direction counterclockwise toward the pressure disk 7, the tilting pins 8, supported between the bearing pockets 73 and 63, are set upright and tilted, as seen from the end side of the pressure disk 7. The sliding slopes 62 and 72 are no longer in contact with each other here, and therefore the first stroke-generating gearing is inactive. The further second stroke takes place only by means of the tilting pin gearing, until the tilting pins 8 are maximally set upright and the clamping axis S lies parallel to the tilting pin axis X, as shown in FIG. 9. The maximum stroke h3 between the outer sides of the stroke-generating disk 6 and the pressure disk 7 is then reached. The second stroke caused by the tilting pin gearing has the value of the difference (h3−h2). The second stroke is preferably smaller than the first stroke.

The transition between the first stroke and second stroke preferably takes place in such a manner that, in a stroke actuating angle diagram, the pitch of the stroke can be differentiated at each point. In other words, the transmission ratio of the first and second stroke-generating gearing should not have an abrupt change in the transmission ratio at the transition between the stroke-generating gearings. By means of this measure, the operating comfort can be improved further since the transition between the first and second stroke-generating gearing can only be felt only very slightly, if at all.

Figure 10:
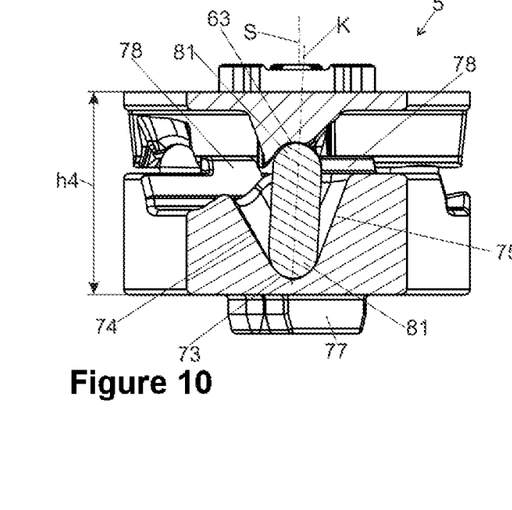
FIG. 10 is a lateral sectional view of the clamping apparatus from FIGS. 7, 8, and 9 in a stable clamping position.

In FIG. 9, the tilting pins 8 are in the dead center position or yield position. The stroke-generating disk 6 can be rotated from the yield position of the tilting pins 8 according to FIG. 9 further in the fixing direction until the stable clamping position shown in FIG. 10 is adopted, in which cams 61 strike against stop projections 78 of the pressure disk 7 and thereby block the further relative rotation. A stable clamping position is thereby produced in which the clamping force reacting axially from the outside on the stroke-generating disk 6 and the pressure disk 7 loads the tilting pin 8 and presses the cams 61 against the respective stop projections, thus preventing an automatic release counter to the fixing direction. The stroke h4 is somewhat smaller than the stroke h3, but the stroke h4 is greater than the stroke h2. The angle between the tilting pin axis K and the clamping axis in the clamping position is preferably greater than 0°, particularly preferably greater than 2°. It is particularly advantageous if the angle is smaller than 5° since too great a loss of clamping force can thereby be avoided.

Figure 11:
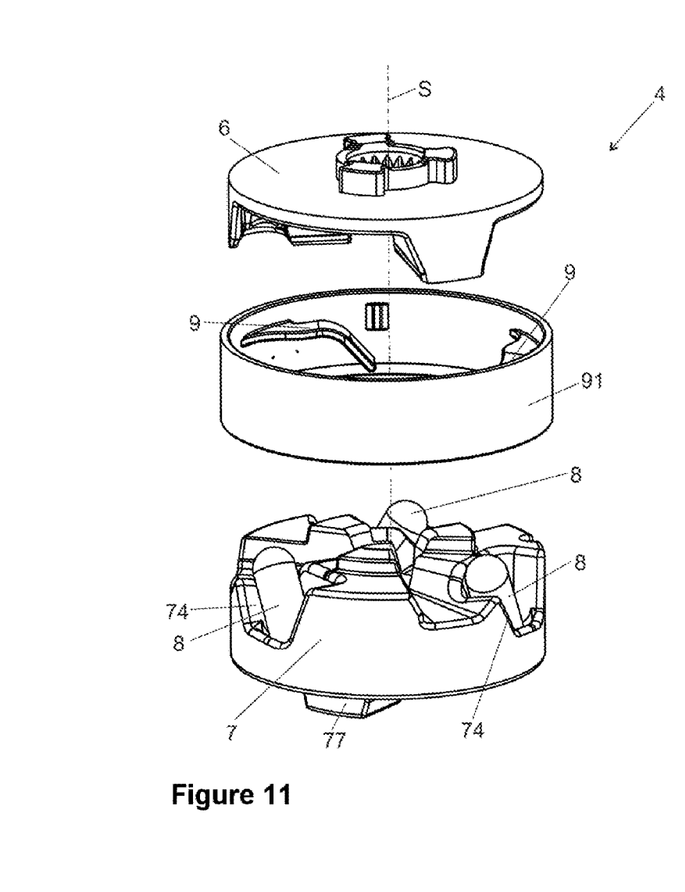
FIG. 11 is an exploded perspective view of a clamping apparatus according to FIGS. 2 to 10 with an additional positioning element.
Figure 12:
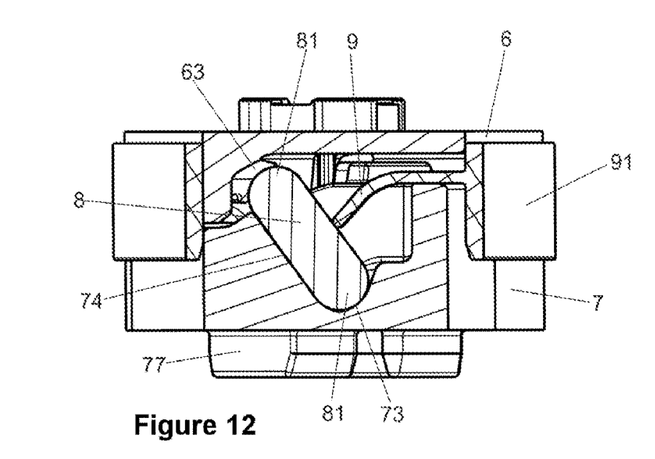
FIG. 12 is a partial sectional view of the clamping apparatus according to FIG. 11.

FIGS. 11 and 12 show a development of the stroke-generating gearing 5 which additionally has positioning elements in the form of spring elements 9 which are attached to an annular spring support 91. The spring support 91 can coaxially surround the stroke-generating disk 6 and the pressure disk 7 and can be axially fixed relative thereto. The sectional illustration in FIG. 12 shows the release position as in FIG. 7. The tilting pins 8 with their ball heads 81 are located on one side in bearing engagement with the bearing pockets 73 of the pressure disk, but not with the bearing pocket 63 of the stroke-generating disk. By means of the spring element 9 protruding radially inwards from the spring support 91, the tilting pin 8 is pressed resiliently into the bearing pocket 73, with the tilting pin lying against the supporting surface 74. The tilting pin is thereby held with respect to the pressure disk 7 in a defined inoperative position. During the transition of the stroke movement between the first stroke-generating gearing, the cam gearing and the tilting pin gearing, it is thereby ensured that the tilting pins 8 enter with the ball head securely and in a defined manner into the bearing pockets 63 in the stroke-generating disk 6 and are mounted.

The spring elements 9 can preferably be formed integrally with the spring support 91, for example as a plastics injection molded part, or as a sheet-metal shaped part.

By means of the first stroke-generating gearing, which is formed from the cams 61 in interaction with the valleys 71 of the cam track, together with the second stroke-generating gearing, which is formed as a tilting pin gearing by means of the tilting pins 8 interacting with the stroke-generating disk 6 and the pressure disk 7, a two-stage clamping apparatus can be realized. The tilting pin gearing preferably has a greater transmission ratio than the first stroke-generating gearing. This means that, when an actuation is provided, the constant rotation of the stroke-generating disk 6 in the fixing direction brings about the clamping movement from h1 to h2 with a greater stroke, but with a smaller clamping force, and from h2 to h3 by the tilting pin gearing with a smaller stroke, but with a greater clamping force.

The arrangement of the tilting pins 8 in the region of the cams 61 and the valleys 71 is particularly compact.

Figure 13:
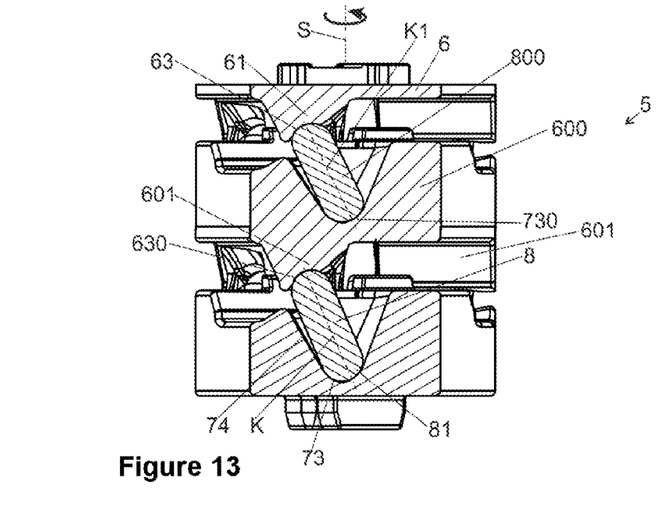
FIG. 13 is a sectional view of another example clamping apparatus.

FIG. 13 illustrates a clamping device in an alternative variant embodiment. The clamping apparatus comprises a stroke-generating disk 6 which is rotatable about a clamping axis S and is connected via a first stroke-generating gearing, a second stroke-generating gearing, a third stroke-generating gearing and a fourth stroke-generating gearing to a pressure disk 7 which is stationary relative to the rotation of the stroke-generating disk 6, wherein an intermediate disk 600 is arranged between the stroke-generating disk 6 and the pressure disk 7 and is rotatable in relation to the stroke-generating disk 6 and the pressure disk 7, wherein the first and second stroke-generating gearings are arranged between the stroke-generating disk 6 and the intermediate disk 600, and the third and fourth stroke-generating gearings are arranged between the intermediate disk 600 and the pressure disk 7, wherein the first stroke-generating gearing is designed to convert a relative rotation of the stroke-generating disk 6 in a first actuating angle range in the clamping direction into a first axial stroke relative to the pressure disk 7, and the second stroke-generating gearing is designed to convert a further rotation of the stroke-generating disk 6 following the first actuating angle range in a second actuating angle range into a second axial stroke between the stroke-generating disk 6 and the pressure disk 7, and the third stroke-generating gearing is designed to convert a further rotation of the stroke-generating disk 6 following the second actuating angle range in a third actuating angle range into a third axial stroke between the stroke-generating disk 6 and the pressure disk 7, and the fourth stroke-generating gearing is designed to convert a further rotation of the stroke-generating disk 6 following the third actuating angle range in a fourth actuating angle range into a fourth axial stroke between the stroke-actuating disk 6 and the pressure disk 7. According to the invention, at least one of the stroke-generating gearings is designed as a tilting pin gearing, with at least one tilting pin 8, 800 which is supported in the direction of its pin axis K, K1 between corresponding bearing points 63, 73, 630, 730 on the stroke-generating disk 6 and the intermediate disk, or on the intermediate disk 600 and the pressure disk 7.

As illustrated in FIG. 13, the second stroke-generating gearing and the fourth stroke-generating gearing are designed as tilting pin gearings. The first and third stroke-generating gearings are designed as cam gearings. Four stroke-generating gearings are thus connected in series, wherein the stroke-generating disk 6 is rotatable in relation to the intermediate disk until they stroke against each other and thus are rotated synchronously in relation to the pressure disk 7 in order to transfer the clamping device from the enabling position, as illustrated in FIG. 13, into the fixing position. It can be provided that the maximum strokes of the individual stroke-generating gearings differ from one another, or the strokes of the first and third stroke-generating gearings are identical. The strokes of the tilting pin gearings are preferably always smaller than the strokes of the remaining stroke-generating gearings. The advantage of this arrangement is that a compact clamping device with a large stroke can be provided.

The arrangement of FIG. 13 can likewise be equipped with a spring support comprising a spring which hold and/or prestress the tilting pins in a defined position.

It is likewise conceivable and possible for three of the stroke-generating gearings to be designed as tilting pin gearings, or for all four stroke-generating gearings to be designed as tilting pin gearings.

What is claimed is:

1. A clamping apparatus for a steering column, the clamping apparatus comprising:
   a stroke-generating disk that is rotatable about a clamping axis and is connected to a pressure disk via a first stroke-generating gearing and a second stroke-generating gearing, with the pressure disk being stationary relative to rotation of the stroke-generating disk,
   wherein the first stroke-generating gearing is configured to convert a relative rotation of the stroke-generating disk in a first actuating angle range in a clamping direction into a first axial stroke relative to the pressure disk,
   wherein the second stroke-generating gearing is configured to convert further rotation of the stroke-generating disk following the first actuating angle range in a second actuating angle range into a second axial stroke between the stroke-generating disk and the pressure disk,
   wherein at least one of the first or second stroke-generating gearings is a tilting pin gearing with a tilting pin that is supported in a direction of a pin axis between corresponding bearing points on the stroke-generating disk and the pressure disk.

2. The clamping apparatus of claim 1 wherein the second stroke-generating gearing is a tilting pin gearing.

3. The clamping apparatus of claim 1 wherein either
   the first stroke-generating gearing is the tilting pin gearing and has a larger transmission ratio than the second stroke-generating gearing, or
   the second stroke-generating gearing is the tilting pin gearing and has a larger transmission ratio than the first stroke-generating gearing.

4. The clamping apparatus of claim 1 wherein the stroke-generating disk is attached to and rotates with a drive element.

5. The clamping apparatus of claim 1 wherein the stroke-generating disk is rotatable with a clamping bolt about the clamping axis.

6. The clamping apparatus of claim 1 wherein the first and second stroke-generating gearings are coaxial.

7. The clamping apparatus of claim 1 wherein the bearing points have bearing pockets molded in a recessed manner into at least one of the stroke-generating disk or the pressure disk.

8. The clamping apparatus of claim 1 comprising a positioning element configured for defined positioning of the tilting pin relative to at least one of the stroke-generating disk or the pressure disk.

9. The clamping apparatus of claim 8 wherein the positioning element comprises a spring element that loads the tilting pin resiliently against at least one of the stroke-generating disk or the pressure disk.

10. The clamping apparatus of claim 1 wherein the tilting pin gearing has a stable clamping position in which the stroke-generating disk and the pressure disk are rotated counter to each other beyond a maximum stroke of the tilting pin gearing, wherein in the stable clamping position stop means strike against one another in a circumferential direction and block further rotation beyond the stable clamping position.

11. The clamping apparatus of claim 1 wherein the first stroke-generating gearing is a cam gearing, wherein cams on the stroke-generating disk are directed axially against a complementary slotted guide mechanism on the pressure disk.

12. The clamping apparatus of claim 1 wherein the first and second stroke-generating gearings are tilting pin gearings.

13. A steering column comprising:
a supporting unit;
an actuating unit; and
the clamping apparatus of claim 1, wherein the clamping apparatus is operatively connected to the supporting unit and to the actuating unit and is configured to exert a clamping force for bracing the supporting unit and the actuating unit.

* * * * *